(12) United States Patent
Giordano et al.

(10) Patent No.: US 8,950,263 B2
(45) Date of Patent: Feb. 10, 2015

(54) LOW FREQUENCY FOLDED PENDULUM WITH HIGH MECHANICAL QUALITY FACTOR, AND SEISMIC SENSOR UTILIZING SUCH A FOLDED PENDULUM

(75) Inventors: Gerardo Giordano, Salerno (IT); Fabrizio Barone, Naples (IT)

(73) Assignee: Universita Degli Studi di Salerno, Fisciano, SA (IT)

(*) Notice: Subject to any disclaimer, the term of this patent is extended or adjusted under 35 U.S.C. 154(b) by 428 days.

(21) Appl. No.: 13/261,040

(22) PCT Filed: Jul. 1, 2010

(86) PCT No.: PCT/IT2010/000293
§ 371 (c)(1),
(2), (4) Date: Mar. 12, 2012

(87) PCT Pub. No.: WO2011/004413
PCT Pub. Date: Jan. 13, 2011

(65) Prior Publication Data
US 2012/0167686 A1    Jul. 5, 2012

(30) Foreign Application Priority Data
Jul. 7, 2009 (IT) .............................. RM2009A0348

(51) Int. Cl.
*G01V 1/18*       (2006.01)
*G01H 1/00*       (2006.01)
*G01P 15/08*      (2006.01)

(52) U.S. Cl.
CPC ................. *G01V 1/186* (2013.01); *G01H 1/00* (2013.01); *G01P 15/08* (2013.01)
USPC ................. 73/653; 73/652; 367/179

(58) Field of Classification Search
CPC .............................. G01P 15/08; G01V 1/181

USPC ................. 73/514.36, 652, 653, 654; 367/179
See application file for complete search history.

(56) References Cited

U.S. PATENT DOCUMENTS 2,989,298 A    6/1961  Ljungstrom
4,010,443 A *  3/1977  Lacorre ...................... 367/179
(Continued)

FOREIGN PATENT DOCUMENTS

CN    1 113 323 A    12/1995

OTHER PUBLICATIONS

PCT Search Report dated Feb. 7, 2011.
(Continued)

*Primary Examiner* — John Chapman, Jr.
(74) *Attorney, Agent, or Firm* — Hedman & Costigan, P.C.; James V. Costigan; Kathleen A. Costigan (57) ABSTRACT

The invention concerns a folded pendulum, comprising:
  a support (F);
  a test mass (PM);
  a simple pendulum (SP);
  an inverted pendulum (IP);
the simple pendulum and the inverted pendulum being connected at one of their ends to the test mass (PM) and at the other end to the support (F) by means of 4 corresponding joint systems (G), the test mass being not connected to the support (F) and being therefore free to oscillate, each joint system (G) relevant to the simple pendulum (PS) comprising one or more joints in tension,
the folded pendulum being characterized in that:
  each of the joint systems (G) relevant to the inverted pendulum (IP) comprises one or more joints in compression.
The invention further concern a seismic sensor utilizing the folded pendulum according to the invention.

10 Claims, 6 Drawing Sheets

(56) References Cited

U.S. PATENT DOCUMENTS 5,095,749 A * 3/1992 Hanson .......................... 73/497
2009/0056447 A1 3/2009 Berthold

OTHER PUBLICATIONS

Liu J et al: "Transfer Function of an Ultralow Frequency Vibration Isolation System" Review of Scientific Instruments, AIP, Melville, NY US LNDK DOI: 10:1063/1.1145553, V. 66, No. 5, May 1, 1995.
Gerardo Giordano: "Development and Test of Tunable Mechanical Monolithic Horizontzal Accelerometer for Low Frequency Seismic Noise Measurement" Thesis Jan. 1, 2008 pp. 1-155.
Alessandro Bertolini et al.; Mechanical Design of a Single-Axis Monolithic Accelerometer for Advanced Seismic Attenuation Systems, Nuclear Instruments and Method in Physics Research A 556(2006)616-623.
F.Acernese Etal.; Tunable Mechanical Monolthic Horizontal Accelerometer for Low Frequency Seismic Noise Measurement, Proc. of SPIE, vol. 7293, 72922J-1(2009).
Jiangfeng Liu et al; Near-Shore Ocean Wave Measurement Using a Very Low Frequency Folded Pendulum, Meas. Sci. Technol, 9 (1998) 1772-1776.
Alessandro Bertolini et al; Monolithic Folded Pendulum Accelerometers for Seismic Monitoring and Active Isolation Systems,IEEE Transactions on Geoscience and Remote Sensing. vol. 44, No. 2, Feb. 2006.
Jiangfeng Liu et al.; Vibration Isolation Performance of an Ultra-Low Frequency Folded Pendulum Resonator, Physics Letters,A 228 (1977) 243-249.
Fausto Acernese et al; Mechanical Monolithic Horizontal Sensor for Low Frequency Seismic Noise Measurement; Rev. Sci. Instrum., 79, 074501 (2008); DOI: 10.1063/1.2943415.
Fausto Acernese et al; Journal of Physics: Conference Series 12 (2008) 012012, "Mechanical monolithic accelerometer for suspension inertial damping and low frequency seismic noise measurement".
F. Acernese et al; Tunable Mechanical Monolithic Sensor With Interferometric Readout for Low Frequency Seismic Measurement, Proc of SPIE, vol. 7110 711011.1 (2008).
F. Acernese et al; Tunable Mechanical Monolithic Sensor With Interferometric Readout for Low Frequency Seismic Noise Measurement, Proc of SPIE vol. 6932 69320K-1 (2008).
Peter R. Saulson; Thermal Noise in Mechanical Experiments, Physical Review D, Third Series, vol. 42, No. 8, 2437-2445 (1990).
Stuart T. Smith et al.; Eliptical Flexure Hinges, Rev. Sci. Instrum., 68, 1474 (1997); DOI:10.1063/1.1147635.
Yakov M. Tseytlin; Rev. Sci Instrum. 73, 3363 (2002); DO1:1063/1. 1499761, "Notch flexure hinges: An effective theory".
ZB Zhou et al.; Low-Frequency Seismic Spectrum Measured by a Laser Interferometer Combined With a Low-Frequency Folded Pendulum; Meas. Sci. Technol. 15 (2004) 165-169.

* cited by examiner

LOW FREQUENCY FOLDED PENDULUM WITH HIGH MECHANICAL QUALITY FACTOR, AND SEISMIC SENSOR UTILIZING SUCH A FOLDED PENDULUM

The invention concerns a low frequency folded pendulum with a high mechanical quality factor, and seismic sensor utilizing such a folded pendulum.

More precisely, the invention concerns a folded pendulum, in particular a monoblock pendulum, that, thanks to its particular conformation is able to guarantee a highest mechanical quality factor. The invention concerns as well a seismic sensor utilizing such a pendulum by measuring the mutual displacement of the test mass of the pendulum and the support of the same.

The principle whereon the majority of the mechanical systems are based, which are nowadays in use for the measurement of the absolute horizontal displacement is, that of the measurement of the relative displacement with respect to an ideally inertial mass, and by means of readout techniques of different (for example optical or electromagnetic) nature.

In the hypothesis, if the mass were actually inertial, such a method would lead to measurements limited both by the thermal noise of the mass, and the readout sensor noise and the ambient noises that are present. In fact, the actual limit of such systems is constituted exactly by the quality of realization of the reference inertial mass.

In the case of horizontal displacement measurements, such systems generally make use of an oscillating system, for example a pendulum, whose oscillating mass is, as a matter of fact, the inertial mass. The realization of a measurement of good sensitivity at low frequency implies, therefore, that the mechanical oscillating system has very low resonance frequency, together with a good mechanical quality factor. The last, indeed, is necessary in order that the apparent movement of the inertial mass be not influenced by the movement of the fixed part of the mechanical system supporting such mass.

For example, in the case of measurement of seismic waves, theoretically an infinitely large mechanical quality factor would indicate the absence of viscous forces suitable to break the movement of the oscillating mass, thus allowing a perfect measurement of the relative displacement between the inertial mass and the Earth.

Mechanical systems with very low resonance frequency, however, have in general very large dimensions and would be very complex to realize.

There exists, however, a particular configuration of principle, the Watts pendulum (folded pendulum), that is very well known in literature, a combination of classical pendulum and inverted pendulum, which allows, instead, to attain very low frequencies keeping at the same time dimensions relatively reduced with respect to the traditional systems, further allowing the carrying out of the tuning of the resonance frequency of the mechanical system [1].

Such a configuration has been utilized more times for such type of measurement, with embodiments that are even very compact. The problem of all the embodiments of such type, that are widely described in literature, is given by the fact that it is not possible to lower the frequency below around 100 mHz, both in vacuum and in air, because of the dissimmetries of the system connected to the way in which the Watts pendulum has been so far realized and the low mechanical quality factor that one can experimentally obtain.

By way of example, imagining a horizontal mechanical sensor that is realized with a simple pendulum whose resonance frequency is 0.5 Hz, one has that the resonance frequency of such a system is $$f_r = \frac{1}{2\pi}\sqrt{\frac{g}{l}}$$

Wherefrom one sees that the dimensions of the oscillating arm of such a pendulum are of around 1 m; if one wants to have lower frequencies, one has therefore to extend the dimensions of the oscillating arm, attaining dimensions of around 100 meters for a frequency of 0.05 Hz.

The solution of the folded pendulum [1] is such that it provides a resonance frequency theoretically equal to 0 with any small dimensions; in the practical realization there are, however, mechanical factors that put a lower limit to the resonance frequency, limiting it, as a matter of fact, to around 70 mHz with a mechanical embodiment whose dimensions are equal to 140×134×40 mm3, as widely acknowledged in literature with respect to small dimensions sensors [2, 3, 4, 5, 6, 7, 8]; moreover, in conditions of ambient pressure, at the minimum resonance frequency of 70 mHz, the mechanical quality factor results to have a value equal to around Q=10, arriving at around Q=140 for a value of the frequency equal to 700 mHz.

Thanks to its features, a sensor of this type can be used in all the applications in which measurements of the movement of the ground at low-frequency are needed, such as for example the manufacturing of seismometers or accelerometers for the analysis of the seismic risk, seismic early warning, etc. The sensor can be further used for the covering of the low-frequency band, providing a further tool for the investigation and extending as a matter of fact the range of frequencies. Thanks to its particularly compact dimensions, such a sensor enjoys an easier transportability and installation, allowing a better on-field integration with respect to the traditional sensors. Moreover, its very limited weight, lower than a kilogram, allows its use as sensor for the stabilization of oscillating structures, even particularly complex structures, such as for example the inverted pendula used for the stabilization of the mirrors constituting the interferometers for the detection of the gravitational waves.

The basic scheme of a folded pendulum is constructed by means of the use of a simple pendulum, and inverted pendulum and a bar that connects the oscillating ends of such pendula [1].

Figure 1:
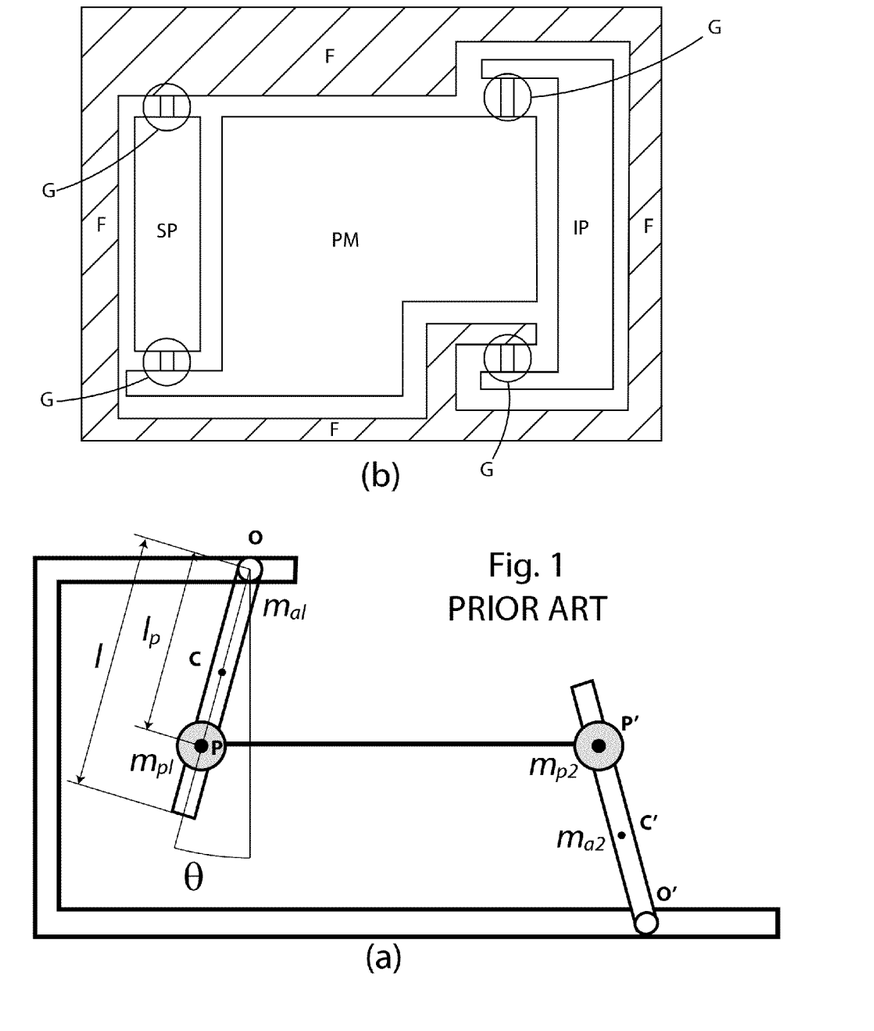
FIG. 1 shows in (a) a principle scheme of folded pendulum according to the known knowledge, in (b) a scheme in a lateral view of a traditional monolithic folded pendulum with joints in tension (whereon four of the eight total joints are visible)
Figure 2:
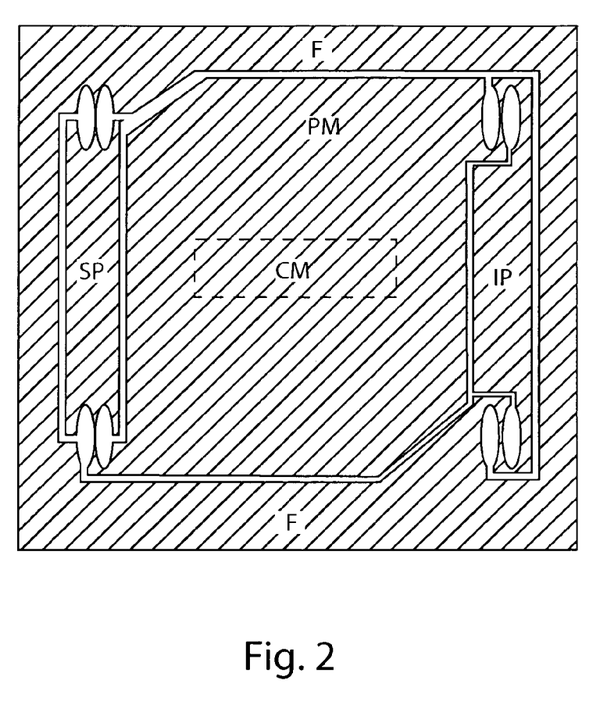
FIG. 2 shows a lateral view of a particular embodiment of the traditional monolithic folded pendulum.

In FIG. 1, the general scheme of the folded pendulum is shown, in FIG. 2 the realization scheme nowadays present in literature is shown (one refers to [2, 3, 4, 5, 6, 7, 8] for an in-depth study).

The reference F refers to the support or "frame", the reference PM to the test mass, the reference IP to the inverted pendulum and the reference SP to the simple pendulum, G instead refers to a generic joint. To the test mass PM one can also add a further mass CM, that is not produced starting from the same monolithic block, called calibration mass, to be used for the calibration of the system in frequency (variation of the natural resonance frequency) [2, 3, 4, 5, 6, 7, 8].

Figure 3:
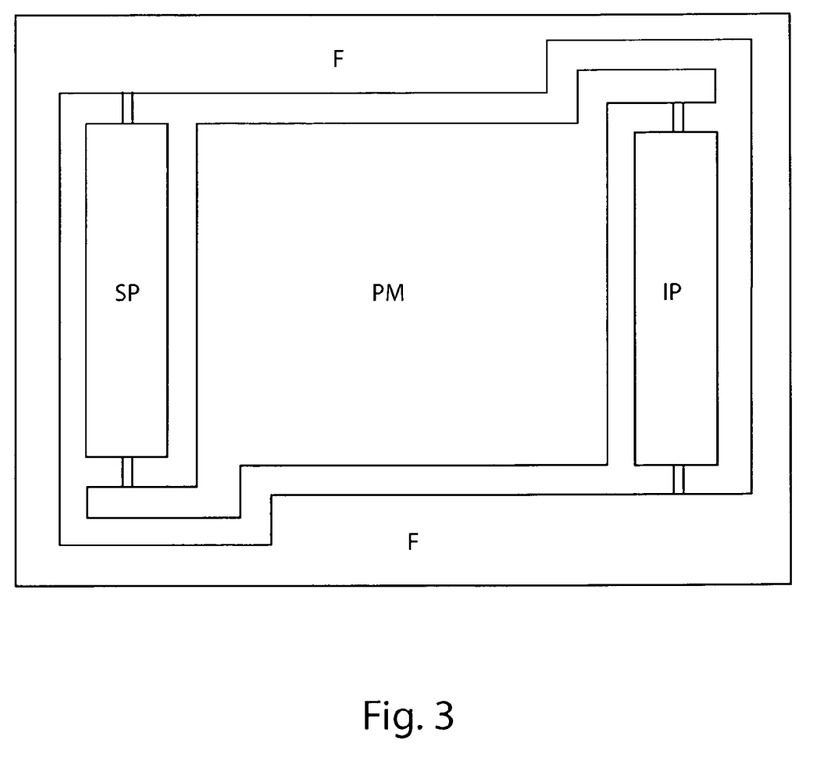
FIG. 3 shows the scheme in lateral view of a folded pendulum according to the invention (four of the 8 total joints are visible)
Figure 4:
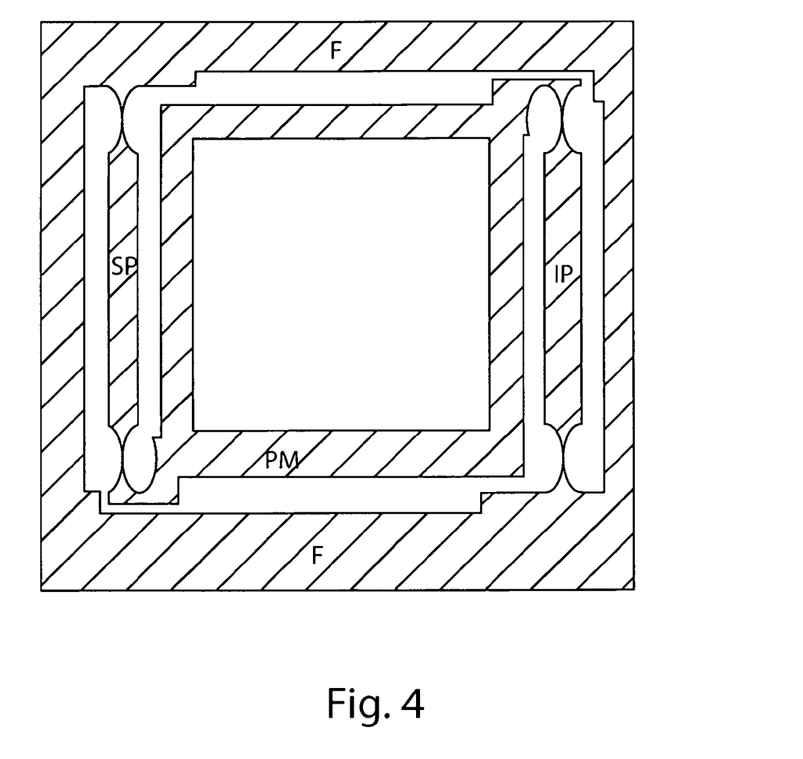
FIG. 4 shows a particular embodiment of the folded pendulum according to the invention.

These references are equally used in FIGS. 3 and 4.

The so-composed system needs four flexible joints. Each joint has been realized in pair (for a total number of eight joints), to the end of limiting the torsional effects of the same joints and, therefore, minimize the coupling between the longitudinal and transversal degrees of freedom: in FIGS. 1 and 2 there are provided lateral views from which it is possible to see the arrangements of 4 joints (one for each pair). Such joints, respectively, connect:

an end of the simple pendulum and the structure supporting it;

the oscillating end of the simple pendulum and an end of the bar connecting the pendula;

the other end of the connection bar and the oscillating end of the inverted pendulum;

the end of the inverted pendulum and the structure supporting the folded pendulum.

To the end of reducing the thermal noise, in particular at low frequency [9], the realization of such a sensor is of the monolithic type. Hence, the joints are constituted by the same material of which the other parts are constituted, the whole (joints and oscillating parts) is made out of an electro-erosion cut working of an only block of material.

Since one has to guarantee the rotation of the arms of the pendula, such joints must be necessarily flexible: for this reason they have a very small thickness, and introduce small restoring forces of the elastic type, due to the deformation of the same joint caused by oscillations [10,11].

Hence, given that the resonance frequency diminishes by the lowering of the joints restoring force, which depends in turn on the thickness of the joint [11], it would seem appropriate to realize the joints with a thickness that is as small as possible.

According to the today's literature, therefore, such joints work both as elements between the parts constituting the folded pendulum and elements of suspension of the system; hence, we see that the connection parts (flexible joints) are designed in such a way that the joints work exclusively in tension. Embodiments of such systems can be those proposed by Liu-Blair [1], Bertolini et al. [2] and Barone et al. [3,4,5,6,7,8].

In particular, the best results, in terms of low resonance frequency and respective high-value of the mechanical quality factor together with limited size of the systems, has been obtained by Barone et al. [3,4,5,6,7,8], with the introduction of joints of the elliptic type: such joints are made out by means of electro-erosion working technique, by performing a cut on the block that will constitute the system, defined by two ellipses having eccentricity $\epsilon=3.2$ and spaced out with respect to each other of 0.1 mm: in such a way a joint remains whose thickness gradually grows thinner along the vertical direction following the profile of an ellipse, attaining the minimum thickness 0.1 mm. Other types of joints, of the circular type (i.e. as obtained by performing a cut along circumferences) have shown clearly lower robustness, evidently owing to the fact that on the bending point of the joint the stress is much larger than that of the elliptic case: in any case, although the strain falls within the limits of elasticity (in materials such as the aluminum), an extended use has brought to the breaking of such circular joints, probably due to a particularly high acceleration to which the system has been submitted; in the case of elliptic joint, instead, one has never observed a breaking of the joint, even in the cases in which the joint has been submitted to an elastic type deformation.

It is an object of the present invention to provide a folded pendulum that solves the problems and overcomes of the drawbacks of the prior art.

It is further specific object of the present invention to provide a seismic sensor based on the folded pendulum object to the invention, that solves the problems and overcomes drawbacks of the prior art.

It is subject matter of the present invention a folded pendulum, comprising:
    a support;
    a test mass;
    a simple pendulum;
    an inverted pendulum;

the simple pendulum and the inverted pendulum being connected at one of their ends to the test mass and at the other end to the support by means of 4 corresponding joint systems, the test mass being not connected to the support and being therefore free to oscillate, each joint system relevant to the simple pendulum comprising one or more joints in tension, the folded pendulum being characterised in that:
    each of the joint systems relevant to the inverted pendulum comprises one or more joints in compression.

Preferably according to the invention, the folded pendulum is formed by a monolithic block of a suitable machined material.

Preferably according to the invention, the monolithic block is cut-machined by electro-erosion.

Preferably according to the invention, each of said joint systems comprises two joints.

Preferably according to the invention, said one or more joints are elliptic joints.

Preferably according to the invention, said joint systems comprise two joints traced by removal of two ellipses with eccentricity $\epsilon>3.2$ and having mutual distance $d>10$ micron.

Preferably according to the invention, the test mass has a form that is substantially parallelepipedic with a central opening, realized in order to reduce its mass.

Preferably according to the invention, the distance between the facing sides of the test mass or the support and in each case of the simple pendulum or inverted pendulum is of at least of 250 μm.

It is further specific subject-matter of the present invention a seismic sensor, comprising:
    a folded pendulum comprising a test mass and a support,
    a system for detection of the apparent displacement of the test mass with respect to the support, and characterised in that the folded pendulum is the folded pendulum that is subject matter of the invention.

Preferably according to the invention, said system for detection of the apparent displacement of the test mass is an optical system and comprises:
    a light source that sends a light beam on to said test mass, and precisely on to
    a mirror that is integral to said test—mass (PM),
    a device for detection of the light reflected by said mirror;
    an electronic elaboration device for the calculation of said apparent displacement.

The invention will be now described by way of illustration but not by way of limitation, with particular reference to the drawings of the enclosed figures, wherein.

The choice of utilizing the configuration of the folded pendulum is in the fact that such a system presents a resonance frequency that is theoretically equal to 0.

Indeed, making reference to FIG. 1 (*a*) and performing the proper calculations, and assuming that the elastic restoring force of the joints is equal to 0, in such a way to have a recall force exclusively of the gravitational type, the system resonance frequency, as expressed in terms of the pulses $\omega_r = 2\pi f_r$, turns out to be equal to:

$$\omega_r^2 = \frac{(m_{a1} - m_{a2})\frac{l}{2l_p} + (m_{p1} - m_{p2})}{(m_{a1} - m_{a2})\frac{l^2}{3l_p^2} + (m_{p1} + m_{p2})} \frac{g}{l_p} \quad (1)$$

Wherefrom one sees that the resonance frequency depends both on the system geometry (length of the pendula arms) and the distribution of the masses (masses of the arms and oscillating bar). In particular, it is here noted that by choosing the masses and the lengths of both the pendula with equal value, the numerator of the preceding expression vanishes, having therefore a resonance frequency equal to the $f_r = 0$ Hz [8].

It is to be noted that such a system guarantees the stability with a suitable choice of the masses constituting the pendula, as well as of the central bar connecting the latter.

In the practical realization however, it is to be taken into account both the fact that the system symmetry is broken, and, above all, the further elastic contribution to the recall force that is added by the joints deformation.

Concerning the first point, to the end of making the joints work in tension, one has a simple scheme for what concerns the design of the suspension of the pendulum, thanks to the fact that the mass of such a pendulum comes out to be suspended, as well as for the joint connecting such pendulum to the bar connecting the pendulum and the inverted pendulum. Instead, as for the suspension of the inverted pendulum, one has that the configuration comes out to be quite complex in the case in which one wishes to guarantee a structure such that the joints work in traction: the innovation introduced is based precisely on the choice to use, on the inverted pendulum, joints working in compression, neglecting the project constraints of having joints submitted to only traction stress. The general scheme presented in FIG. 3, and the particular embodiment of FIG. 4, show the new design that one is proposing.

Such a choice is based on the fact that the elliptic-type joint is particularly resistant with respect to the previously adopted solution with circular joints: the experimental realization shows, in a quite evident way, that even in the presence of particularly high loads in compression (up to around 1 kg as a whole, that is a load in compression of around 250 g for each joint relevant to the inverted pendulum) the joint does not seem to experience a stress such to lead to its breaking, demonstrating the validity of such a design.

Moreover, by following such a scheme, the structure results to be evidently simpler, with improvements that are evident both from the point of view of the low frequency stability (around 100 mHz), and in terms of the mechanical quality factor, Q. In particular for the last, different measurements have been performed which were directed to establish the new value, even in relation to their values obtained using preceding versions. For the measurement of the value of Q, one has made use of a reading system of the optical type able to measure, with a suitable calibration, the relative shifting of the oscillating mass with respect to the structure supporting it [8]. The procedure of measurement of the value of the mechanical quality factor Q consists in shifting, after having suitably leveled the folded pendulum in such a way that its equilibrium position corresponds to the minimum of the mechanical potential, the oscillating mass at one end of its position and then leaving it free: in such a way the mass tends to come back towards its equilibrium position generating oscillations. Such oscillations can be described analytically by means of a sinusoid whose amplitude decreases exponentially during time (being it a system of the oscillating type having damping factor lower than the critical damping). Once the values are digitally acquired during time, performing a fit for the search of the value of the exponential characteristic constant, one derives the value of the mechanical quality factor Q. It is to be noted that the value of Q depends on the resonance frequency of the mechanical system; one recalls here in particular that the progression of Q as a function of the frequency results to be of the linear type (increasing monotonic) for high values of frequency (case of external dissipation, that is for all the measured frequency values) and of the quadratic type for low frequency values (case of internal dissipation).

From the analysis of the analytic expression of the resonance frequency of the folded pendulum, one sees that the frequency depends on the distribution of the masses, therefore it is possible to perform a tuning of the resonance frequency by varying the position of the mass centre of the oscillating mass by means of a calibration mass; in the series of the proposed measurements one has varied the mass centre by means of the addition of calibration masses of different value (the value of such a mass ranges from around 100 g to around 1 kg), obtaining different measurements of their mechanical quality factor Q in the range [180,680] mHz.

Figure 5:
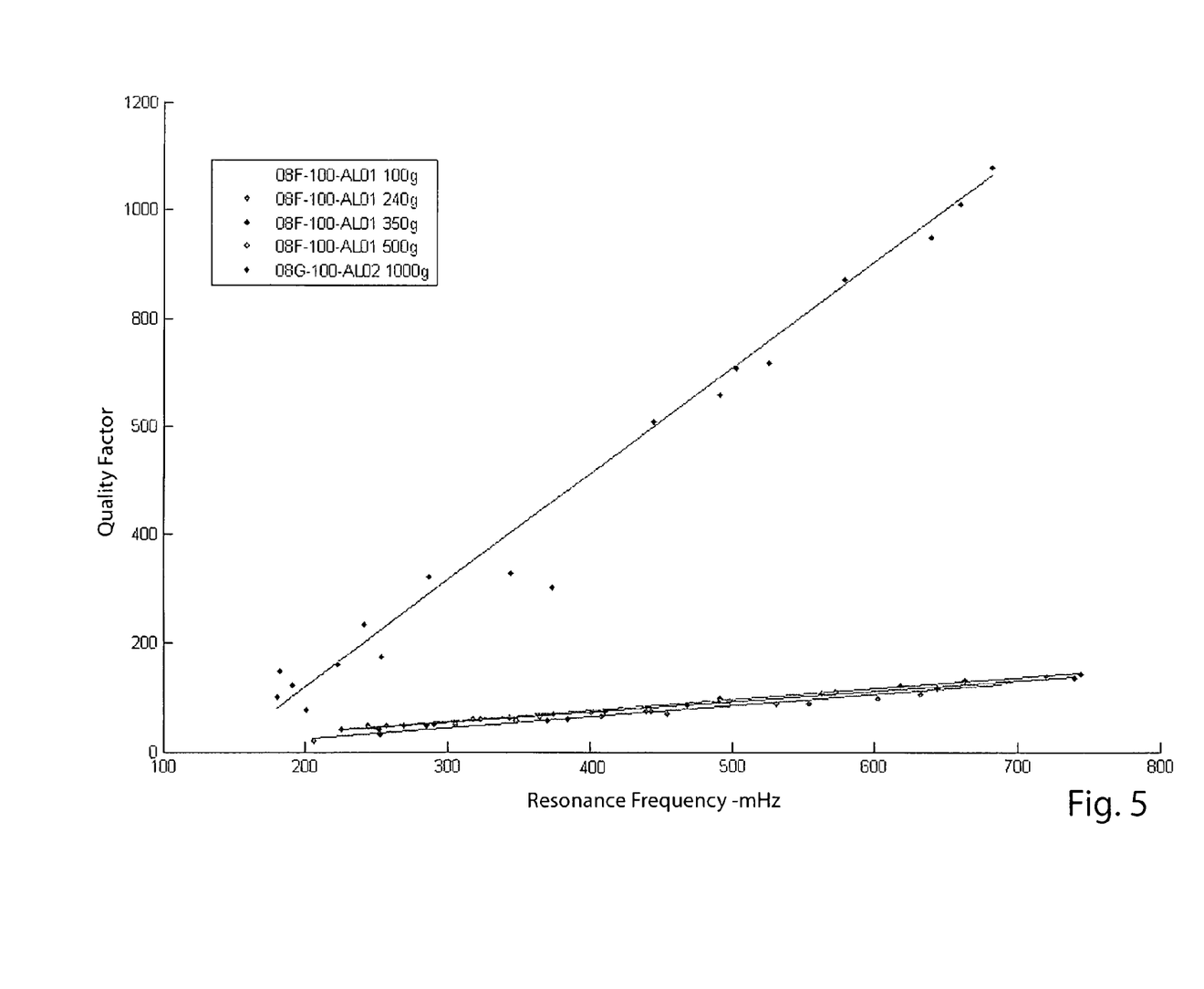
FIG. 5 shows the comparison between a mechanical quality factor Q of the sensor according to the invention (08G-100-AL02, black stroke, with higher Q values) with respect to the sensor described in literature (08F-100-AL01, lines with color stroke), as a function of the system resonance frequency.
Figure 6:
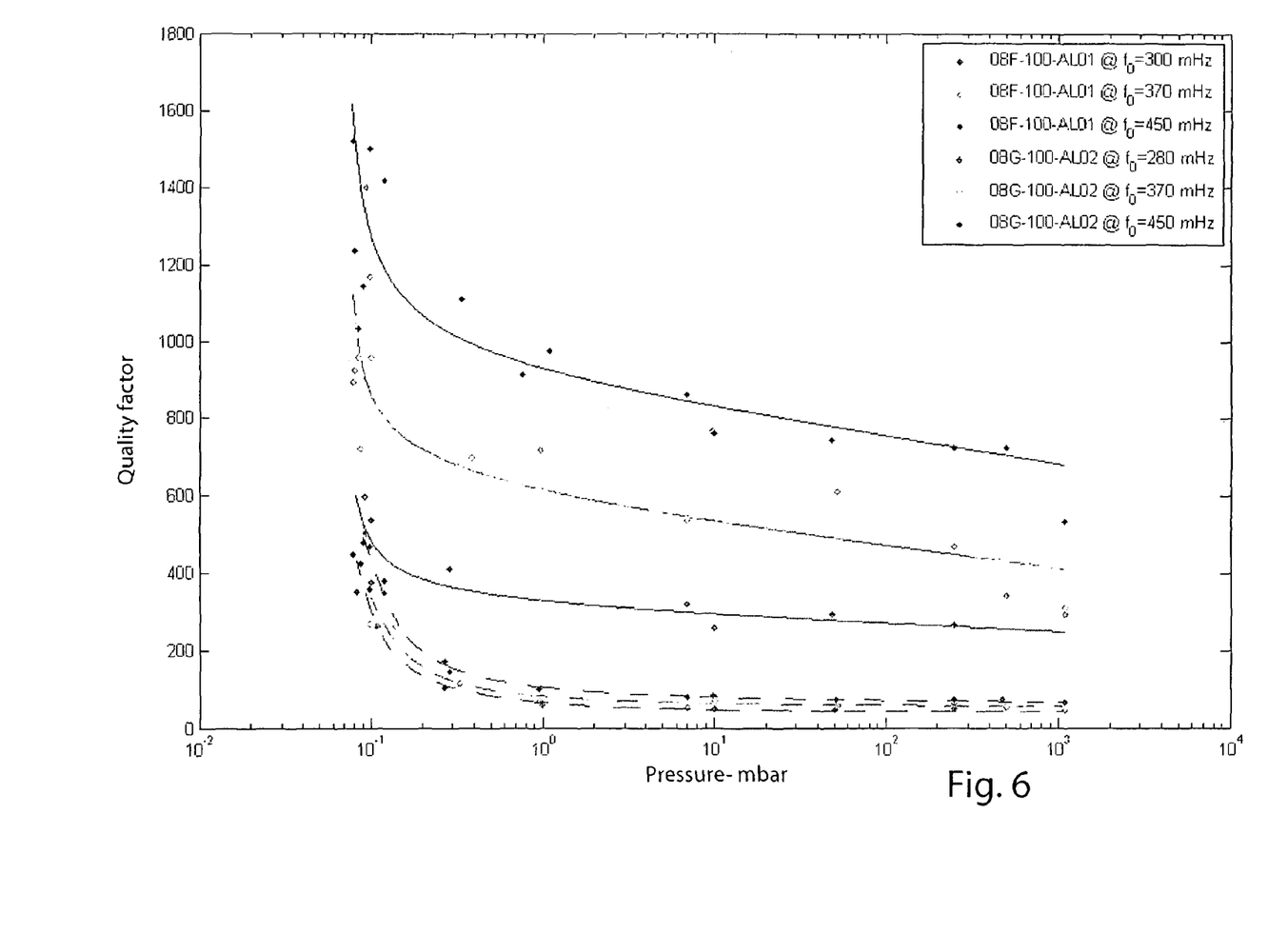
FIG. 6 shows the comparison between the mechanical quality factor Q of the sensor according to the invention (08G-100-AL02, with continuous stroke lines) with respect to the sensor described in literature as a function of the surroundings air pressure (08F-100-AL01, with discontinuous stroke lines).

From the analysis of the data, one derives the clear improvement of the mechanical quality factor at different system resonance frequencies, as reported in FIG. 5: in such a figure it is reported the progression of the mechanical quality factor as measured with respect to the new system with joints in compression (indicated with the reference 08G-100-AL02) loaded with a calibration mass of 1 kg, and the measurements performed with the traditional system with joints in traction (reference 08F-100-AL01): one can note how the proposed system results to have an improvement of Q of almost an order of magnitude at all the measured frequencies. Such measurements has been performed at ambient pressure: the new system with joints in compression, having wider lateral gaps, that is a wider interspace between the oscillating part and the fixed structure, one has assumed in a first moment that the improvement could depend on the better downflow of the air from the gaps during oscillation. Such downflow is due to the variations of volume of the interspaces during the oscillations, but, as one demonstrates, with a further series of measurements in vacuum that are shown in FIG. 6, the improvement of the quality factor comes out to be notable also in vacuum (up to pressure values of around $10^{-4}$ bar), deriving that the improvement is to be attributed to the particular innovative design and not only to the better downflow of the air.

Moreover, tests have been performed on elliptic joints to the end of evaluating their mechanical qualities and choosing the characteristics depending on the application. An example of the progression of the mechanical characteristics of the joint as a function of the ellipticity for a thickness of the joint equal to 0.1 mm is reported in literature [4].

On the basis of the above remarks, the calibration in frequency can be performed both by acting on the thickness of the joints (in the realization step of the system) and on the calibration mass (setting step). In particular, the variation of the thickness of the joints to the end of calibrating the system in frequency allows to reduce its resonance frequency without modifying the basic design. The importance of such an approach is evident if one takes into account the fact that at low resonance frequencies the mechanical symmetry of the system becomes one of the project specifications that are fundamental for the mechanical stability of the same system. Therefore, the reduction of the resonance frequency of the system by means of reducing the mechanical thickness of the joints, without modifying the system's symmetry, makes the mechanical stability of the system at low frequencies less critical. The variation of the resonance frequency of the system by means of displacements of the calibration mass, instead, is remarkably more critical, exactly by virtue of the loss of system symmetry (and therefore the variation of distribution of the loads in the various joints) above all near the lowest frequencies.

The lower limit of the thickness of the joint is given by the maximum load that it can support without deforming plastically. The realization of such joints can be performed by realizing beforehand the joint by electro-erosion and acting afterword by means of electro-polishing techniques. In such a way, it is possible to obtain thicknesses of the joints even of the order of 30 microns, that are still suitable for the mechanical realization of size equal to $140 \times 134 \times 40$ mm$^3$ [2,3,4,5,6,7,8]. Lower values, although possible, would not guarantee a suitable robustness of the system in the most common uses. Indeed, a too small thickness can provoke the breaking of the joint, both because of the bending stresses introduced by the rotation of the pendula arms and the traction stress due to the weight of the oscillating mass of the structure, that is fully resting on the joints, that is why indeed a minimum limit for the thickness exists.

Obviously, what has been said above has widely general validity, because the invention system is widely scalable and adaptable in terms of dimensions and resonance frequency in any application. The thickness of the joint is, therefore, a function of both the physical dimensions of the system and the project resonance frequency. This implies the necessity of defining each time such thickness during the system realization and design step, on the basis of the application specifications.

To summarize, the low frequency oscillating mechanical system according to the invention is based on a new design and realization of the Watts pendulum, since elliptic joints has been used, the half part of which work in a new way (in compression, instead of in traction as in all the embodiments described in literature):

Such a innovative technical solution is the key element that, by guaranteeing a perfect symmetry of the system, allows to improve both the functioning of the pendulum at low frequency and the mechanical quality factor of a factor of at least 10 with respect to the today realized systems (as obtained by the first experimental realizations), keeping identical robustness and reliability characteristics.

It is here noted again the joints that work in compression at the ends of the inverted pendulum unlike the joints at the ends of the simple pendulum which work in traction, and the symmetry of the system.

The sensor according to the invention finds use in all the fields where the utilization of an inertial mass along the horizontal direction is needed, such as for example the horizontal seismic sensors.

BIBLIOGRAPHY

[1] J. Liu, L. Ju and Blair D. G. (1997), *Vibration isolation performance of an ultra-low frequency folded pendulum resonator*, Physics Letters A, Elsevier, 228, (14 Apr. 1997), pp. 243-349.

[2] A. Bertolini, et al., (2006), *Mechanical design of a single-axis monolithic accelerometer for advanced seismic attenuation systems*, Nuclear Instrument and Method, No. 556, p. 616.

[3] F. Acernese, R. De Rosa, G. Giordano, R. Romano and F. Barone (2009), *Tunable mechanical monolithic horizontal accelerometer for low frequency seismic noise measurement*, Proc. SPIE Vol. 7292, pp. 72922J-1-72922J-12, doi: 10.1117/12.814106.

[4] F. Acernese, R. De Rosa, G. Giordano, R. Romano and F. Barone (2008), *Mechanical monolithic horizontal sensor for low frequency seismic noise measurement*, Review of Scientific Instruments, Vol. 79, pp. 074501-1-074501-8, ISSN:0034-6748, doi:10.1063/1.2943415.

[5] F. Acernese, G. Giordano, R. Romano, R. De Rosa, and F. Barone (2008), *Mechanical monolithic accelerometer for suspension inertial damping and low frequency seismic noise measurement*, Journal of Physics, Conference Series (on line), Vol. 122, pp. 012012-1-012012-6, ISSN:1742-6596, doi:10.1088/1742-6596/122/1/012012.

[6] F. Acernese, R. De Rosa, G. Giordano, R. Romano and F. Barone (2008), *Tunable mechanical monolithic accelerometer for low frequency seismic noise measurement*, Proc. SPIE Vol. 7110, pp. 711011-1-711011-12, doi: 10.1117/12.800429.

[7] F. Acernese, R. De Rosa, G. Giordano, R. Romano and F. Barone (2008), *Tunable mechanical monolithic sensor with interferometric readout for low frequency seismic noise measurement*, Proc. SPIE Vol. 6932, pp. 69320K-1-69320K-12, doi:10.1117/12.772196.

[8] G. Giordano (2008), *Development and test of tunable mechanical monolithic horizontal accelerometer for low frequency seismic noise measurement*, Tesi di Dottorato in "Rischio Sismico", Università degli Studi di Napoli "Federico II".

[9] P. R. Saulson (1990) *Thermal noise in mechanical experiments*, Physical Review D—Particles and Fields, 3rd series, Vol. 42, No. 8, 15 Oct. 1990, pp. 2437-2445.

[10] T. Stuart, et al. (1997) *Elliptical flexure hinges*, Review of Scientific Instruments, 68 (3).

[11] Y. M. Tseytlin (2002) Notch flexure hinges: an effective theory, Rev. Sci. Instrum., Vol. 73, No. 9, September 2002, pp. 3363-3368.

The preferred embodiments have been above described and some modifications of this invention have been suggested, but it should be understood that those skilled in the art can make variations and changes, without so departing from the related scope of protection, as defined by the following claims.

The invention claimed is:
1. Folded pendulum, comprising:
a support;
a test mass;
a simple pendulum;
an inverted pendulum arm;

the simple pendulum arm and the inverted pendulum arm being connected at one of their ends to the test mass and at the other end to the support by means of 4 corresponding joint systems, the test mass being connected to the support only by means of the simple pendulum arm and the inverted pendulum arm and being therefore free to oscillate, each joint system relevant to the simple pendulum comprising one or more joints in tension, the folded pendulum being characterised in that:

each of the joint systems relevant to the inverted pendulum comprises one or more joints in compression.

2. Folded pendulum according to claim 1, characterised in that it is formed by a monolithic block of a suitable machined material.

3. Folded pendulum according to claim 2, characterised in that the monolithic block is cut-machined by electro-erosion.

4. Folded pendulum according to claim 2, characterised in that the distance between the test mass and the simple pendulum arm or inverted pendulum arm, and the distance between the simple pendulum arm or inverted pendulum arm and the frame is of at least of 250 µm.

5. Folded pendulum according to claim 1, characterised in that each of said joint systems comprises two joints.

6. Folded pendulum according to claim 1, characterised in that said one or more joints are elliptic joints.

7. Folded pendulum according to claim 6, characterised in that said joint systems comprise two joints traced by removal of two ellipses with eccentricity $\epsilon > 3.2$ and having mutual distance d >10 micron.

8. Folded pendulum according to claim 1, characterised in that the test mass has a form that is substantially parallelepipedic with a central opening, realized in order to reduce its mass.

9. Seismic sensor, comprising:
a folded pendulum comprising a test mass and a support,
—a system for detection of the apparent displacement of the test mass with respect to the support,
and characterised in that the folded pendulum is the folded pendulum according to claim 1.

10. Seismic sensor according to claim 9, characterised in that said system for detection of the apparent displacement of the test mass is an optical system and comprises:
a light source that sends a light beam on to said test mass, and precisely on to
a mirror that is integral to said test mass,
a device for detection of the light reflected by said mirror;
an electronic processing device for the calculation of said apparent displacement.

* * * * *